United States Patent [19]

Austin et al.

[11] Patent Number: 4,708,155

[45] Date of Patent: Nov. 24, 1987

[54] BEVERAGE DISPENSING VALVE WITH EASY OPENING

[75] Inventors: Forrest L. Austin; Duncan T. Lasley, both of Hennepin Cty., Minn.

[73] Assignee: The Cornelius Company, Anoka, Minn.

[21] Appl. No.: 771,747

[22] Filed: Sep. 3, 1985

[51] Int. Cl.[4] .............................................. F16K 31/10

[52] U.S. Cl. ........................................ 137/1; 137/594; 251/129.19; 251/129.2; 251/282

[58] Field of Search ................ 251/282, 129.2, 129.19; 137/1, 594

[56] References Cited

U.S. PATENT DOCUMENTS

| | | | |
|---|---|---|---|
| 2,361,685 | 10/1944 | Grise | 251/282 X |
| 2,564,686 | 8/1951 | Gray | 251/282 X |
| 2,698,159 | 12/1954 | Crum | 251/129.19 |
| 2,943,792 | 7/1960 | Moen | 251/282 X |
| 3,211,417 | 10/1965 | Ray | 251/129.2 |
| 3,718,233 | 2/1973 | Nordhoff | 251/129.2 X |

FOREIGN PATENT DOCUMENTS

| | | | |
|---|---|---|---|
| 609485 | 11/1980 | Canada | 251/282 |
| 1450547 | 12/1968 | Fed. Rep. of Germany | 251/129.19 |

*Primary Examiner*—Arnold Rosenthal
*Attorney, Agent, or Firm*—Henry C. Kovar

[57] ABSTRACT

A beverage dispensing valve for pre-mix carbonated beverage has a pressure balancing structure for enabling easy opening of the valve and an improved drive mechanism providing a relatively higher force for opening the valve; the balancing structure has a balance piston on a nose of a normally closed poppet valve, the piston is on a floppy mount and is sealed to a balance cylinder in the pressurized beverage line forming a balance chamber upstream of the piston, the chamber is vented to atmosphere to relieve beverage pressure on most of the area of the poppet valve to reduce the opening force required; the drive mechanism includes an electric solenoid having an elastic tension spring in the solenoid plunger, the spring elastically connects the plunger to the poppet valve to generate an improved and greater force. A dispensing system has several of these valves with a single low power transformer for all of the valves. A method of dispensing pre-mix carbonated beverage has the new steps of balancing the beverage pressure upon the upstream side of a poppet valve so that it is relatively easy to open the valve, and elastically applying an opening force upon the poppet valve to pop it open when the elastic force exceeds the required opening force.

24 Claims, 8 Drawing Figures

Fig. 6
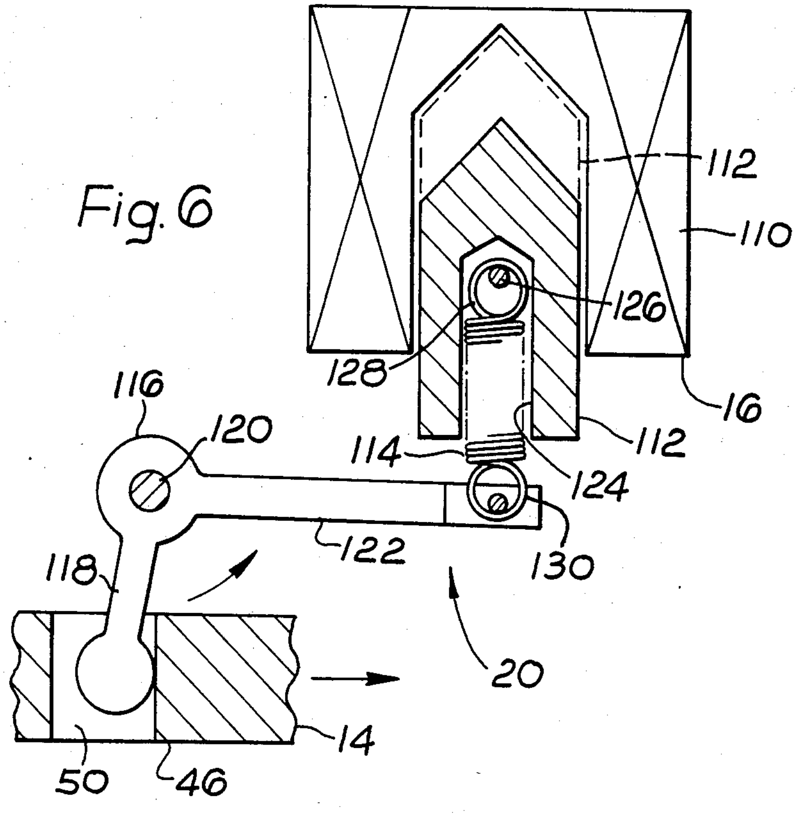
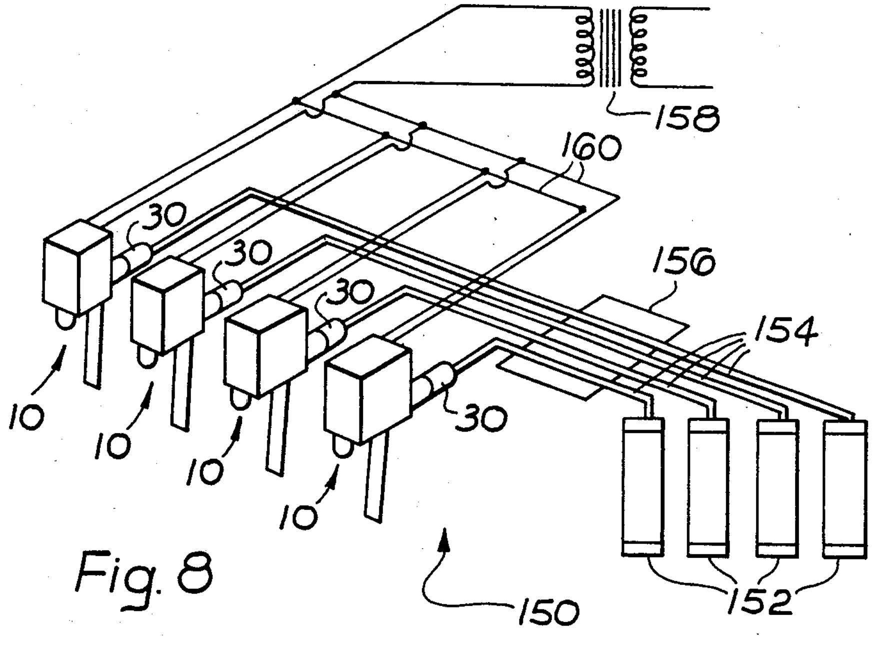
Fig. 8

BEVERAGE DISPENSING VALVE WITH EASY OPENING

BACKGROUND OF THE INVENTION

1. Field of the Invention

This invention, pertains to a beverage dispensing valve having structure for and a method of providing for easy and rapid opening.

2. The Prior Art

Dispensing valves for premix carbonated beverage have become standardized in the last thirty years. The world standard is a premix dispensing valve developed by R. T. Cornelius which is subject of U.S. Pat. No. 2,899,170. A successful, competitive dispensing valve somewhat along the same basic lines was developed by H. J. Hansen and is subject of U.S. Pat. Nos. 3,291,441 and 3,502,111. These valves have been and are the standards that are employed and seen throughout the world where premix carbonated beverages are dispensed by retailers.

A very successful low cost multiflavor premix carbonated beverage was also developed by R. T. Cornelius and is the subject of U.S. Pat. No. 3,216,445. This valve is a world standard and has never been successfully challenged in the last twenty years. This valve is typically used in the bar business for filling mixed drinks and working behind counters. It is an expedient low cost device that dispenses slowly, does not have flow rate adjustment, and takes little space and is quite usable for low pressure and modest dispensing rates. It will not work satisfactorily in all environments, but suffices for specific applications.

Premix carbonated beverage is a complete beverage, just as is found in bottles and cans, which is packaged in bulk in metal tanks under pressure. The soft drink bottler treats his water and prepares and carbonates premix and fills it into the tanks. Premix is then distributed in these tanks while under carbonation pressure to the retailer. Premix beverages can be most readily seen at outdoor events where the tanks may sit outside in the sun, and in lower volume food retailers, and places where local water is bad so post-mix is not used.

Post-mix carbonated beverage mixes syrup together with cold carbonated water in the dispensing valve. The syrup and water are each pressurized at about 25 PSIG (1.76 $Kg/cm^2$).

Draft beer is much like premix, but it is kept cold and has less carbonation. The typical pressure on draft beer is in the range of 7–12 PSIG (0.50–0.85 $Kg/cm^2$).

Non-carbonated drinks such as are seen in the transparent vat dispensers, are given a pressure of one to three, PSIG (0.1–0.2 $kg/cm^2$) at the dispensing valve, usually by a circulation pump.

Coffee, tea, chocolate drinks, milk and the like are usually dispensed under a gravity head pressure or line water pressure regulated down to 3–5 PSIG (0.2–0.35 ($kg/cm^2$).

Premix carbonated soft drink is a unique beverage and it poses very difficult problems, some of which are not easily appreciated.

Very high CO2 pressures are required. At a room temperature of 70 degrees F. (21 degrees C.) the most popular beverages such as colas, lemon-lime and root beer require 60–70 PSIG (4.2–4.9 $Kg/cm^2$), diet beverages require 50–60 PSIG (35–4.2 $kg/cm^2$), and the low carbonation fruit flavors like orange require 30–40 PSIG (2.1–2.8 $kg/cm^2$). The premix bar valve of U.S. Pat. No. 3,216,445 is seldom used for these variations in pressure because it is used only for the high carbonation popular beverages in the bar trade. This bar valve cannot accommodate the different propellent pressures. These room temperature pressures will many times not work at outdoor events. Premix beverage tanks typically set on hot asphalt in the sun and the temperature may go up to 140 degrees F. (60 degrees C.). Much higher pressures are required. A typical practice is to keep raising the storage and propellent pressure until the beverage stops foaming. Storage and propellent pressures over 100 PSIG (7.0 $kg/cm^2$) are quite common. The valve and valve seat areas in premix valves have to be kept large in order to give low flow velocities that do not give foaming of the beverage and the propellent pressure must be high enough to prevent loss of carbonation and foaming in the beverage lines.

It is relatively difficult to open a premix valve. Firstly, it requires a much greater force than required by post-mix or non-carbonated beverage valves, and secondly it must be opened completely and reasonably fast because when a premix valve is only partially opened, the beverage tends to foam and you cannot effectively fill a cup; you end up with a high percentage of foam and relatively low volumetric efficiency.

What is needed is force and quickness. These are relatively easy to provide for post-mix valves. A typical elctric post-mix valve has an actuator lever with a switch, and one or two relatively small solenoids that open small water and syrup valves against a nominal 25 PSIG pressure. The same situation applies more or less to non-carbonated dispensing valves.

Premix valves have been manually actuated by a top lever. The operator holds the cup in one hand under the valve and pulls the actuator lever atop the valve with the other hand, the same practice has been prevalant for beer valves.

The current preferred actuator for post-mix beverage dispensing valves is a downward extending lever that a cup is pushed against. This type of valve and actuator require the use of only one hand, and two cups can be filled at one time by a single person, specifically, a cup in the left hand and a cup in the right hand. This valve and actuator come in two species. The least complicated and costly has the lever connected directly to the valves so that there is a pure mechanical opening of the valve elements. The second version has an electric switch on the lever and one or two solenoids to open the valve elements. The major soft drink companies prefer the electric solenoid type valves because the push on the lever is less and lighter, less costly cups can be used, the opening and closing of the valve element is as fast as possible so that there is minimum foaming. The valves do not partially open or close and consequently foam, and electronic portion control can be used with solenoids.

However, just any solenoid cannot be used. A beverage valve must be low voltage, 30 volts or less to meet electrical codes. The maximum power available must be 75 VA in order to meet electrical codes. In order to have an economical electric-type valve, one transformer is usually supplied for six valves. The transformer provides enough power to open any three valves at a time. This has been difficult for post-mix valves but it has been achieved and is now routine practice.

This has never been successfully done on premix carbonated beverage dispensing valves. There are several reasons this has never been done. It takes a force of about 15 lbs. (6.8 kg) to open a Cornelius or Hansen premix valve. There is not an economical solenoid and transformer combination that can do this work and meet electrical codes.

The Booth company of Dallas, Tex., has been offered a premix valve with a lever that can be cup actuated but this valve has never been successful because the cup lever must be pushed with your fingers if disposable cups are used, and the valve structure is not suitable for other than specific environments. This Booth valve is not known to be subject of a patent.

OBJECTS OF THE INVENTION

It is an object of the present invention to provide a premix carbonated beverage dispensing valve that is relatively easy to open.

It is an object of the present invention to provide an easy opening beverage valve having structure for relieving the dispensing system pressure upon the valve element.

It is an object of the present invention to provide an electrically actuatable premix carbonated beverage dispensing valve that meets electrical codes and is economically viable.

It is an object of the present invention to provide a practical and successful premix carbonated beverage dispensing valve that can be actuated with a disposable cup.

It is an object of the present invention to provide a new method of dispensing premix carbonated beverage.

It is an object of the present invention to provide a new and improved method of opening a premix carbonated beverage dispensing valve.

It is an object of the invention to provide an electrically actuable premix carbonated beverage dispensing system.

These and other objects of the invention will become manifest to those versed in the act upon reviewal and study of the disclosures and teachings herein.

SUMMARY OF THE INVENTION

According to the principles of the present invention, a premix carbonated beverage dispensing valve has a valve body with a normally closed poppet valve and structure for opening the poppet valve, on the upstream end of the poppet valve is a new structure for balancing the pressure of the beverage against the valve.

An easy opening beverage dispensing valve has a valve body, structure for reciprocating a normally closed poppet valve, a balance cylinder rearward of a valve seat, a balance piston co-movable with the poppet valve, and structure for venting to atmosphere that part of the cylinder which is rearward of the piston.

An electrically actuatable premix carbonated beverage dispensing valve has a valve body with a manually closed poppet valve, an electric solenoid having a movable plunger and a spring elastically connecting the plunger to the poppet valve.

A method of dispensing carbonated beverage at saturation pressure has the step of balancing the pressure on a valve head by venting the majority of the upstream area of the valve head to atmosphere.

An electrically actuatable premix carbonated beverage dispensing system has a dispenser with a plurality of premix valves, a supply for premix beverage to each valve, an electrical solenoid for each valve, a single voltage reducing and current limiting transformer for the solenoids, an electric switch for each solenoid with the switches being connected in parallel to the transformer, and a spring elastically connecting each solenoid plunger to a poppet valve in each dispensing valve.

BRIEF DESCRIPTION OF THE DRAWINGS

FIG. 6 is a cross-sectional detailed view of the solenoid and drive for the poppet valve of the structure of FIG. 1;

FIG. 8 is a schematic of an electrically actuatable premix carbonated beverage dispensing system according to the present invention.

DESCRIPTION OF THE PREFERRED EMBODIMENT

Figure 1:
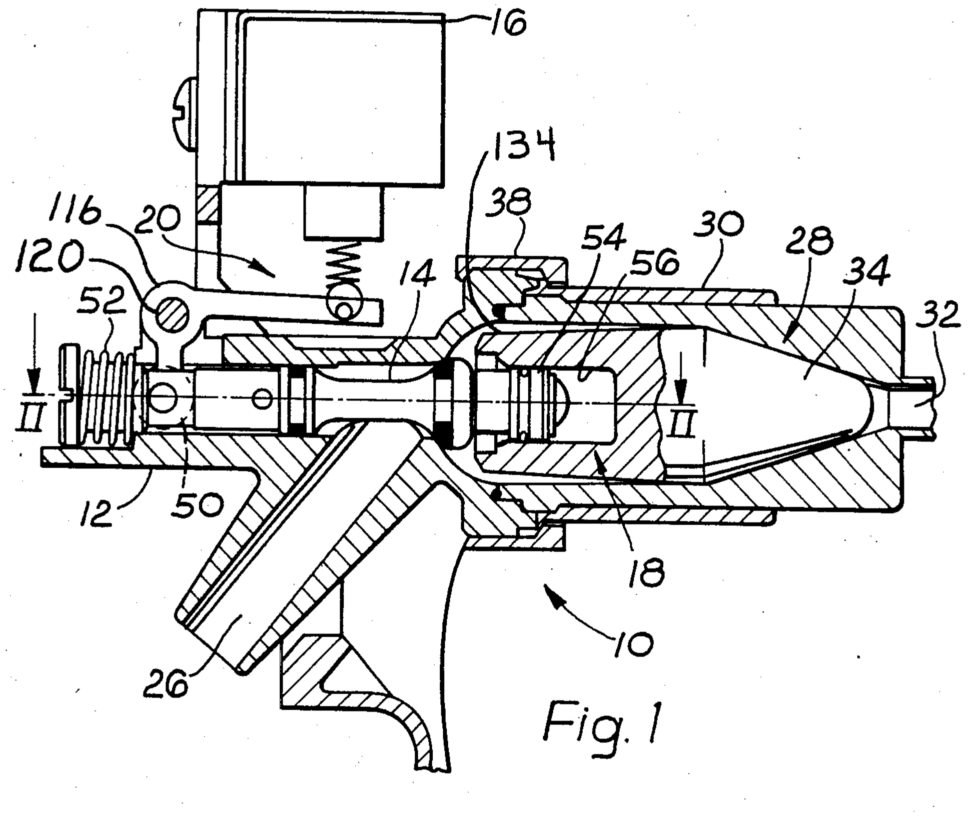
FIG. 1 is an elevational cross sectional view of the preferred embodiment of a beverage dispensing valve according to the present invention.
Figure 2:
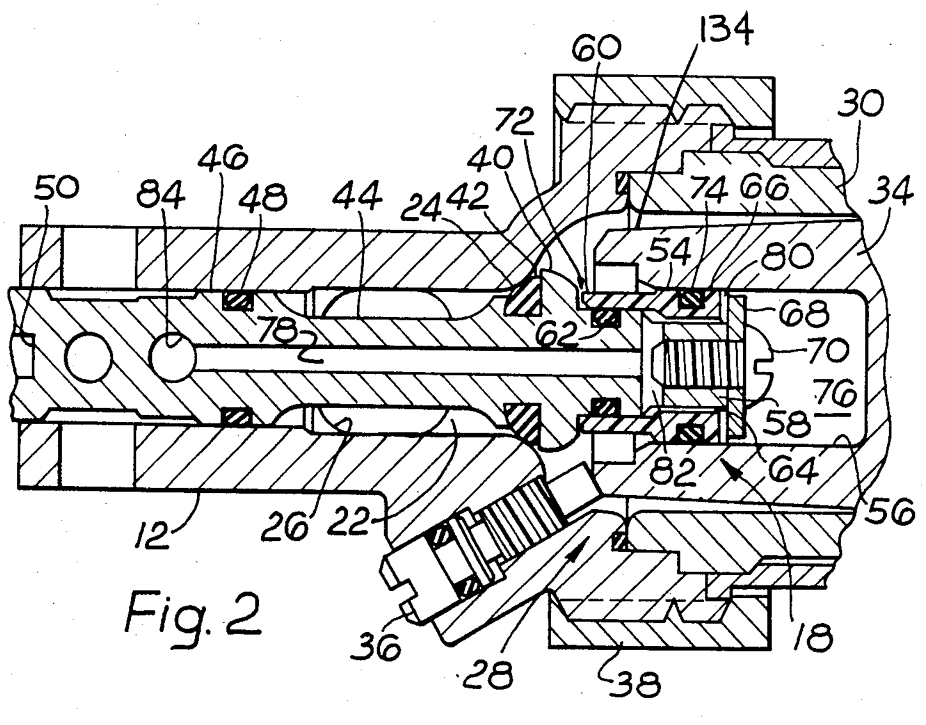
FIG. 2 is a cross sectional detailed view through lines II—II of FIG. 1.

According to the principles of the method and apparatus of the present invention, a beverage dispensing valve is provided as is shown in FIG. 1 and generally indicated by the numeral 10. The valve 10 is specifically for premix carbonated beverage and has a valve body 12, a manually closed poppet valve 14, and an electric solenoid 16 for opening the poppet valve 14.

Important features in the structure of this invention and which are utilized for important steps in the method of this invention are structure for balancing the beverage pressure against the poppet valve 14, this structure being generally indicated by the numeral 18, and the drive mechanism between the solenoid 16 and the poppet valve 14, the mechanism being generally indicated by the numeral 20.

The body 12 has a valve bore 22, a valve seat 24 which faces rearward or upstream, and a spout 26. Rearward and upstream of the body 12 and seat 24 is a beverage inlet section with an adjustable flow control, generally indicated by the numeral 28. The flow control 28 has an inlet shank 30, the beverage inlet port 32, an axially movable flow compensator 34, and a compensator adjustment screw 36. The screw 36 is turned inward to back up the compensator 34 and reduce the beverage flow, and the screw 36 is turned outward to let out the compensator 34 and increase the beverage flow. The shank 30 is removably retained to the valve body 12 by a collar nut 38; when the nut 38 is turned off, the valve body 12 and poppet valve 14 separate from the shank 30 for cleaning or replacement.

The poppet valve 14 has a head 40, an elastomeric valve seal 42, and an elongate body 44 extending past the spout 26 to a guide piston 46 having a sliding seal 48 and an actuation device 50. A helical coil compression-type closing spring 52 is mounted on the front of the guide piston 46.

The balancing structure 18 includes a balance piston 54 mounted on the upstream and inlet end of the poppet valve 14, and a balance cylinder 56 in the downstream end 134 of the compensator 34. Both the balance piston 54 and cylinder 56 are inside of the pressurized beverage flow path. The poppet valve head 40 has a nose 58 extending upstream and into the hollow balance piston 54. The nose 58 has a stepped diameter and a stepped clearance to the balance piston 54. The downstream end 60 of the balance piston is closely fitted and relatively fixed upon the poppet valve nose 58 and is sealed to the nose 58 by a semi-static seal 62. There is a significant clearance toroid 64 between an upstream end 66 of the balance piston 54. The balance piston 54 is axially retained upon the nose 58 by a washer 68 and screw 70 fastened into the nose 58. There is a significant axial clearance 72 provided for the balance piston 54 on the nose 58. A specific preferred clearance toroid 64 has a thickness of 0.015 inch (0.4 mm) or greater, and an axial clearance of 0.16 inch (0.4 mm). The piston upstream end 66 carries a dynamic sliding cylinder seal 74 that slidingly seals the piston 54 to the cylinder 56. The balance piston 54 floats up on the poppet valve 14 and the piston upstream end 66 is floppy about an axis of the poppet valve 14 so that the piston 54 successfully accommodates all eccentricity of the compensator 34 and the balance cylinder 56 and maintains a successful seal between the piston 54 and the cylinder 56. The poppet valve 14, balance piston 54, balance cylinder 56 and compensator 34 all share a common axis and are coaxial. The washer 68 and screw 70 are within the balance cylinder 56 and are kept out of contact with beverage so that the floppy motion of the piston 54 is assured. The piston 54 is co-movable with the poppet valve 14, and moves back and forth in the balance cylinder 56 when the valve 10 is operated.

That part of the balance cylinder 56 which is upstream of the cylinder seal 74 forms a balance chamber 76 which is filled with ambient air and is vented to ambient via a vent bore 78 in and through the poppet valve 14. This chamber 76 communicates through a plurality of radial slots 80 on the piston upstream end 66, then through the clearance toroid 64 to a nose cross bore 82 upstream of the seal 62, then into the vent bore 78 to a piston cross bore 84 outward beyond the sliding seal 48. The cross bore 84 is always opened to and in communication with ambient so that ambient air can go in and out of the balance chamber 76 via the vent bore 78 and so that the balance chamber is always maintained at atmospheric pressure and as such, the balance chamber 76 is a pneumatic chamber.

The ratio of the area of the balance cylinder 56 to the area of the effective diameter of the valve seat 24 and valve seal 42 is such that the area of the balance cylinder 56 is at least a majority, and preferably more, of the area of the effective diameter of the valve seat 24. For example, the preferred effective diameter of the valve seat is about 0.50 inch (12.7 mm) and the preferred diameter of the balance cylinder is 0.45 inches (11.4 mm), the balance cylinder 56 having an area of about 80 percent of the area of the effective diameter of the valve seat 24. The preferred valve bore 22 is about 0.46 inch (11.7 mm) diameter and the area of the balance cylinder 56 while less than the area of the valve bore 22, is preferably at least 90 percent or more of the area of the valve bore 22.

In this configuration and at a premix pressure of 75 PSIG (5.3 kg/cm$^2$) the pressure previously upon the poppet valve and the force which in the past has been needed to open the poppet valve is about 14.7 pounds (6.7 kg). The quantity of pressure and force balanced and relieved by the balance means is about 11.9 pounds (5.4 kg) which gives a pressure and opening force in the new valve 10 of this invention of about 2.8 pounds (1.3 kg). This is a dramatic and previously unobtained result in a premix carbonated beverage dispensing valve. There are frictional and hysteresis losses that must also be overcome, but these are a small fraction of the pressure forces.

Figure 3:
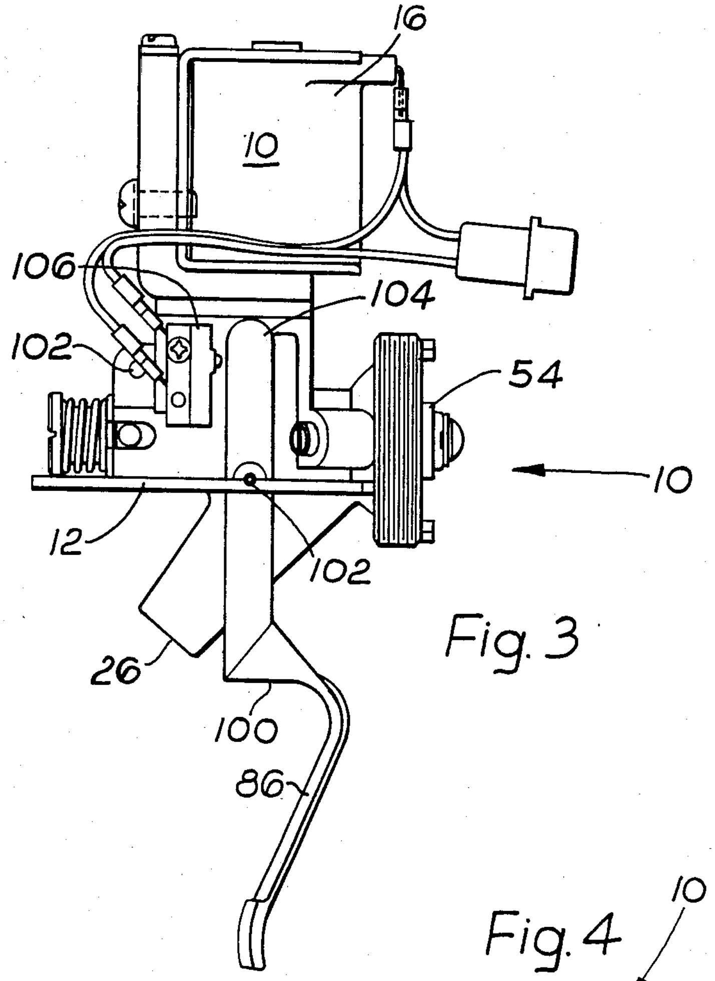
FIG. 3 is a side elevational view of the structure of FIG. 1, showing electric actuator structure.
Figure 5:
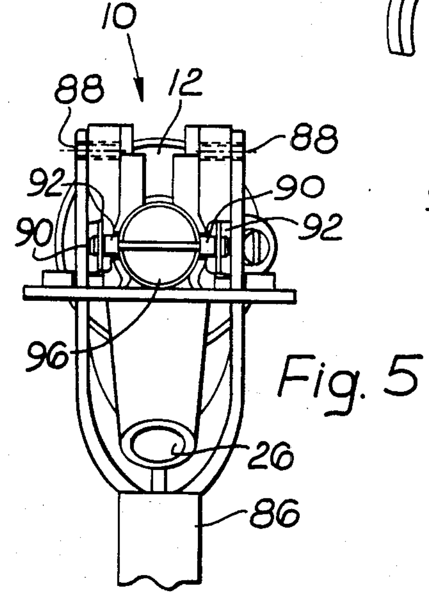
FIG. 5 is a frontal elevational view of the structure of FIG. 3.
Figure 4:
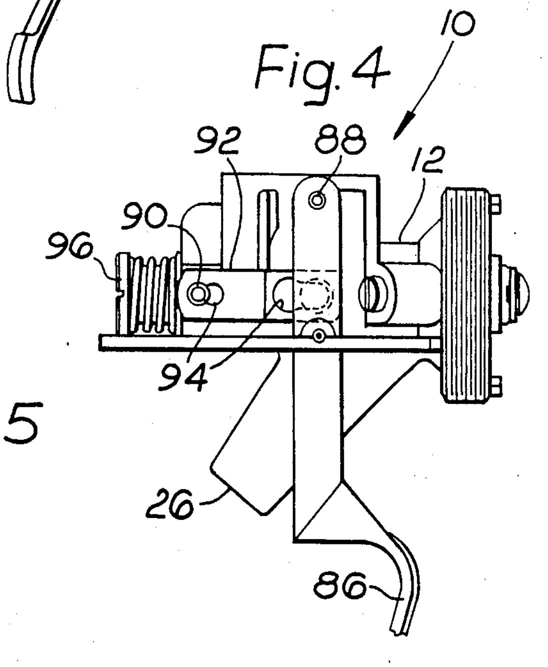
FIG. 4 is a side elevational view of the structure of FIG. 1, showing alternative mechanical actuator structure.

A new cup actuatable downward extending mechanical valve actuator 86 is shown in FIGS. 4 & 5. The mechanical valve actuator 86 is a Y-shaped first class lever hanging from a pair of top mounted fulcrum pins 88 in the valve body 12 above the poppet valve 14. A cross pin 90 extends through the poppet valve guide piston 46 and is connected to the mechanical lever 86 by a pair of tension links 92. When the mechanical lever 86 is pushed rearward with a cup, the links 92 pull the cross pin 90 and the manually closed poppet valve 14 is pulled rearward to an open position so that beverage will flow. The mechanical lever 86 and arrangement of the links 92 provides a force multiplication of about 6:1 from the cup force to the force exerted on the poppet valve 14. With this actuator 86, premix carbonated beverage can be dispensed with one hand, without electricity, and two cups can be filled at once if there is a cup in the left hand and a cup in the right hand. The mechanical actuator 86 assembles and disassembles very easy by virtue of the keyhole connections 94 to the cross pin 90 and lever 56. When the poppet valve 14 is pushed rearward, the links 92 disconnect, and the poppet valve 14 can be removed by removal of cross pin 90 and the closing spring screw 96. When the valve body is removed from the shank 30, as shown in FIGS. 3–5 the balance structure 18 is visually and directly accessible for washing, sanitizing and inspection. The mechanical force exerted upon the poppet valve 14 is absolutely symmetrical and in a straight line and there is no bending or torsional loading of components. The opening actuation and subsequent closing action is simple, reliable, and fool-proof. The device is easily cleaned and serviced by non-technical personnel and is extremely useful in outdoor events where there is no electricity. Such events include outdoor ballgames, picnics, parades, and so forth, and the absence of electricity totally eliminates any electrical hazard. This mechanical dispenser valve 10 is actuatable with disposable paper and plastic cup and does not require a glass cup as does the prior art.

The new and preferred electrical actuator is shown in FIGS. 1, 3, & 6 and enables actuation by an electrical lever 100 as is shown, or by a push-button switch (not shown) or by an electronic portion control device (not shown). The electronic lever 100 is another Y-shaped lever which wraps upward around the valve spout 26 and is pivotably suspended from a pair of fulcrum pins 102 which are mounted at a level below the valve bore 22. An upward extending switch arm 104 from one side of the Y-shape engages an electric switch 106. The solenoid 16 is mounted atop the valve body 12 and is upright with the solenoid coil 110 being fixed to the valve body 12 and the plunger 112 being vertically movable during actuation. The drive mechanism 20 connects the solenoid plunger 112 to the poppet valve 14 via an elastic drive spring 114 and a first-class drive lever 116. The drive lever 116 is L-shaped and has a generally vertical leg 118 engaging the poppet valve 14, a fulcrum 120 above the poppet valve 14, and a generally horizontal leg 122 extending rearward above the poppet valve 14 from the drive lever fulcrum 20 to the drive spring 114. The plunger 112 has its length sized so that when it is pulled upward into the coil 110, the lower surface of the plunger 112 is then flush with the lower surface of the coil 110, as is shown in dotted lines, enabling the coil 110 to be mounted as low as is possible. The coil 110 is completely spaced from the valve body 12 so that all coil heat is convectively carried off and not conductively taken into the valve body 12. The drive spring 114 has a majority of its length mounted inside of a bore 124 in the plunger 112. The diameter of the bore 124 and of the spring 114 are preferably less than one-half the diameter of the plunger 112 so that there is no loss of force output by the solenoid 16. A cross pin 126 in the plunger 112 and through the bore 124 retains a first end 128 of the spring in the bore 124. A second end 130 of the spring 114 is secured to the drive lever horizontal leg 122. The spring 114 is a closed coil helical wound tension spring with pre-loaded coils. Both the plunger 112 and spring 114 are positioned to the rear of the drive lever fulcrum 120, and both free fall under gravity to their normal down position without other assistance and the vertical mounting makes the mass of the plunger 112 insensitive to lateral impacts. The vertical pull of the plunger 114 also minimizes the wear on the plunger 114 and coil 110 and the solenoid 16 can be expected to have a service life of $10^7$ cycles. The hysteresis effects of the plunger 112 on the coil 110 are also negated.

Figure 7:
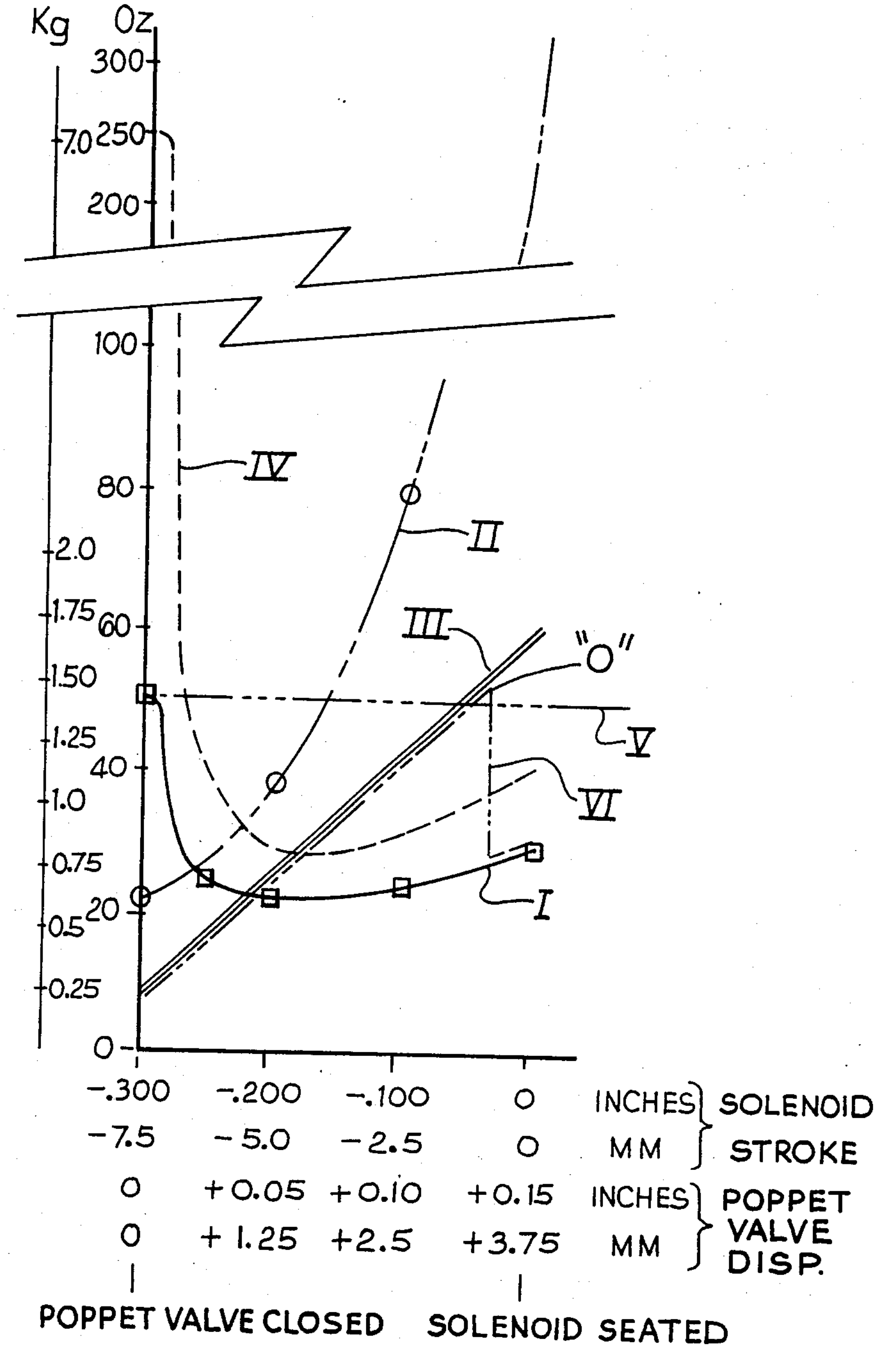
FIG. 7 is a graph indicating the forces required and provided by various components of the structure of FIG. 1.

FIG. 7 graphically illustrates various force versus movement characteristics.

Curve I represents the force required to open the dispensing valve 10 of the present invention at a nominal beverage pressure of about 75 PSIG (5.3 kg/cm$^2$). Curve II represents the output force of the solenoid 16. Curve III represents the tension output of the drive spring 114. Curve IV represents the force required to open the prior art valve of Cornelius or Hansen at the same pressure as for the valve 10 of the present invention Curve I. It will be seen that the solenoid 16 cannot open the prior Cornelius or/Hansen valve. Until this invention, there has not been an electrical combination that will open the prior art valve and meet electrical codes; that is why there are no electric premix valves.

The preferred solenoid 16 also has a force that is a little short of what is required to open the valve 10 if the solenoid 16 is directly connected to the poppet valve 14. When the solenoid 16 force exceeds level V, the solenoid 16 then has enough force to open the poppet valve 14. However the poppet valve 14 does not yet open. The plunger 112 continues towards its seat until the spring tension exceeds level V at point "0". As the plunger 112 continues to seat and the tension of the spring 114 continues to increase, the poppet valve 14 snaps open somewhere past point "0" and as the force of the spring 114 is increasing and the force required by the poppet valve 14 is decreasing, there is a definitive snap-action opening of the poppet valve 14 as the spring 114 contracts from its extension at point "0" to a much lesser extension as is required to provide the force to overcome the force in Curve I. The actual operative output of the spring 114 is illustrated on Curve VI. The solenoid 16 has to have an actual plunger travel in excess of twice the travel of the poppet valve 14 in order to maintain a small amount of spring 114 stretch when the poppet valve 14 is completely open, which absolutely minimizes foaming from a partially open poppet valve 14. There is no solenoid buzz as the work load is overcome and the opening is reliable, quick, and can be achieved with a relatively small solenoid 16. After the poppet valve 14 is opened, the effective output of the spring 114 will decrease to what is required for the maximum opening of poppet valve 14 and the spring *114* *will collapse to the length required to provide this* force as the poppet valve 14 opens. The force curve II of the solenoid 16 always exceeds and is over the output curve III of the spring 114. The early output of the solenoid 16 can be less than the force required to open the poppet valve 14, and the relatively large seating force of the solenoid 16 can be utilized to pop the poppet valve 14 open. The force of both the solenoid 16 and the spring 114 must cross over and exceed the force needed to open the poppet valve 14 before the plunger 112 seats in the coil 110. The relatively low magnitude of curve I as compared to curve IV is what has made manual actuation with disposable cups possible, and what has contributed greatly to being able to open the valve 10 with relatively small solenoids.

FIG. 8 schematically illustrates a premix carbonated beverage dispenser system, generally indicatd by the numeral 150 and utilizing the previously described new dispensing valves 10. The system 150 has individual premix tanks 152 for each flavor, the tanks 152 are pressurized at a nominal 75 PSIG (53 kg/cm$^2$) with compressed CO2 to maintain the carbonation of the premix beverage and to provide sufficient propellent pressure to enable dispensing without foaming. A product line 154 leads from each tank 152 through a heat exchanger 156 which cools the beverage to about 35 degrees F. (1 degree C.) and then to a respective shank 30. These systems components of tank 152, line 154, exchanger 156 and shank 30 can be either new, or an old existing installed systems. One of the positive attributes of this new dispensing valve 10 is that it retrofits to existing Cornelius-type systems which are in place throughout the world. To make a retrofit, the old Cornelius style valve is removed together with the old compensator, and a new dispensing valve 10 and new compensator 34 are placed on and in the old shank 30 to attain cup actuated and/or electric premix dispensing. The dispensing valves 10 may be the mechanical cup actuated dispensing valves 10 of this invention as are shown in FIGS. 4 & 5.

The dispensing valves 10 may also be the electric version shown in FIGS. 1, 3 & 6. A low current transformer 158 is connected to supply power via leads 160 to the electric dispensing valves 10. With the new balancing structure 18 and drive mechanism 20 in each of the electric dispensing valves 10, a relatively small solenoid 16 has been usable. A specific preferred solenoid 16 is a 27 watt DC intermittent duty 24 VDC solenoid by Deltrol Controls which has force curve II of FIG. 7. The transformer 158 must be 75 VA or less to comply with electrical codes. Whereas previous efforts at an electric premix valve could not open a single valve with a 75 VA transformer, a single 50 VA transformer with a 100 percent duty cycle at 24 VDC full wave with a bridge rectifier (not shown) can now provide sufficient power for an entire system 150 having four, five, six or more of the new electric premix valves 10 and provide sufficient power for continuously concurrent opening of two of the dispensing valves 10 and for intermittent concurrent opening of up to four of the dispensing valves. All of the electric dispensing valves 10 of the system 150 are connected in parallel by lead 160 to a single low VA transformer 158. This is the first successful low VA system 150 that can economically meet electrical codes and not pose a hazard to the operators of the system 150.

It has been found that this new dispensing valve 10 and the system 150 can operatively and successfully be manually activated with a cup as previously described and then automatically shut off with the automatic dispensing structure and control of L.D. McIntosh U.S. Pat. No. 3,916,963 enabling even further advantages to be realized from the inventions herein.

The advantage of this new dispensing valve 10, the balancing structure 18, the drive mechanism 20 for opening the valve, and the system 150 are many.

Premix carbonated beverages can now be dispensed using one hand, can easily be dispensed two cups at a time, can now be electronically portion controlled, inventory control is now possible, foaming is reduced and the speed of service is increased because topping-up is no longer necessary because of the increased volumetric efficiency. For the first time, an electric premix system can be commercialized that meets electrical codes.

This new invention also retrofits on the hundreds of thousands, perhaps millions of existing Cornelius premix valves presently in use throughout the world. It can also work for high pressure water and for beer.

In due time, many more advantages will most likely be perceived and enjoyed by those versed in the art and into work with or use the subject of this invention.

Although various minor modifications may be suggested by those versed and experienced in the art, be it understood that we wish to embody within the scope of the patent warranted hereon all such embodiments as reasonably and properly come within the scope of our contributions to the art.

We claim as our invention:

1. A pre-mix carbonated beverage dispensing valve, comprising (a) a valve body having an inlet, an outlet, a valve seat, and in which is mounted a normally closed reciprocable popet valve and means for selectively opening said poppet valve;

(b) balancing means on an upstream end of said poppet valve for balancing the pressure of the premix carbonated beverage against the poppet valve, and for lessening the force required to open the poppet valve to less than the force required to otherwise open the poppet valve in the absence of said balancing means; and (c) a carbonated beverage flow rate control compensator fluidly in said inlet and positioned upstream of said poppet valve, said compensator having a downstream end which faces said poppet valve and is operatively connected to said balancing means.

2. A pre-mix valve according to claim 1, said compensator downstream end comprising an operative portion of said balancing means.

3. A pre-mix valve according to claim 1, in which said balancing means includes a full floating balance piston movable mounted on the poppet valve, said piston being sealingly engageable in & with a movable balance cylinder upstream of said poppet valve and in said compensator.

4. A pre-mix according to claim 2, in which said balancing means comprises a cylinder in the downstream end of said compensator, and a balance piston sealed to and movable in the cylinder, said piston being mounted to said poppet valve and having a diameter equal to a majority of a diameter of said valve seat.

5. A pre-mix valve according to claim 2, in which said piston has a downstream end sealed to and relatively fixed upon the poppet valve, and an upstream end sealed to the balance cylinder and relatively floppy about an axis of the poppet valve.

6. A pre-mix valve according to claim 1, including (a) an electric solenoid having a frame fixed to the valve body and a plunger movable with respect to the valve body; and (b) a spring elastically and operatively connecting the solenoid plunger to the poppet valve.

7. A easy opening carbonated beverage dispensing valve comprising:

(a) a valve body having a pressurizable inlet, an outlet, and a valve seat between the inlet and outlet;

(b) a reciprocable poppet valve in said body, said poppet valve having a valve head normally seatable upon said valve seat, and a protruding nose extending from said valve head;

(c) means for reciprocating said poppet valve rearward for opening the dispensing valve and enabling flow of beverage past the valve head and valve seat;

(d) a balance cylinder to the rear of said valve seat and said valve head, said cylinder having a crossectional area at least equal to a majority of the outlet area within said valve seat;

(e) a balance piston on said nose of the poppet valve head, said piston being co-movable with said poppet valve and having means for fluid tightly sealing itself to said cylinder;

(f) means for venting to atmosphere that part of the cylinder which is rearward of the piston;

(g) said nose including a seal to which the rear of the piston is sealingly engaged, and retaining means for retaining the piston upon the nose and in engagement with the seal with a front end of the piston having a cylinder seal movably and sealingly engageable with the balance cylinder; and (h) in which the piston front end and cylinder seal are mounted relatively floppy about said protruding nose.

8. A beverage valve according to claim 7, in which said venting means extends between the nose and the piston, and between the piston and the retainer means.

9. A beverage valve according to claim 8, in which said retaining means comprises a washer and screw fastened to said nose, said washer and screw being within said balance cylinder and out of contact with the beverage.

10. A beverage valve according to claim 7, in which said reciprocating means comprise:

(a) an electric solenoid having a coil mounted on the valve body and a plunger movable in the coil;

(b) a valve lever connected to poppet valve; and (c) a spring operatively connecting the plunger to the valve lever.

11. A method of dispensing carbonated beverage comprising the steps of (a) providing carbonated beverage at a normally closed valve head, said beverage being under a propellant pressure equivalent to or greater than the carbonation saturation pressure of the beverage;

(b) balancing the pressure upon the valve head by venting the majority of the upstream area of the valve head to atmosphere; and (c) opening the valve by applying an opening force to the valve head, which opening force is sufficient to overcome the beverage pressure applied only upon a minority of the area of the valve head, and (d) developing the opening force upon the valve head by:

(1) energizing an electric solenoid and pulling in a solenoid plunger;

(2) elastically stretching an elastic connection of the plunger to the valve head until the force providing the stretching exceeds the force required to open the valve; and (3) popping the valve head open while taking in the elastic connection.

12. A method according to claim 11, in which the venting is of a relatively movable balance chamber, said balance chamber being at least partially within a beverage flow rate compensator and being movable within the beverage; and further including the step of sealing the balance chamber to the valve head.

13. A method according to claim 12, including the further step of full floating a seal member upon the valve head, and sliding the full floating seal member fore and aft in the relatively movable balance chamber.

14. A method according to claim 11, including the further step of mechanically multiplying the force developing the stretch, said multiplying being done between the elastic connection and the valve head.

15. An electrically actuatable pre-mix carbonated beverage dispensing valve, comprising (a) a valve body having an inlet, an outlet, a valve seat, and a reciprocable poppet valve normally closing and upon the valve seat;

(b) an electric solenoid having a coil fixed with respect to the body and a plunger movable with respect to the body and the frame;

(c) a spring elastically connecting the solenoid plunger to the poppet valve; and in which (d) the spring is a pre-loaded closed coil helical tension spring having a second end outside of the plunger bore.

16. The valve of claim 15, in which the spring has a first end connected to the plunger in a bore within the plunger.

17. The valve of claim 16, in which the plunger has a cross-pin through the bore, said spring having a first end connected to the cross-pin.

18. The valve of claim 15, in which the solenoid is mounted vertically above the poppet valve, said plunger and spring being free-falling downward by gravity to their normal position.

19. The valve of claim 15, in which the operative output force curve of the solenoid is above the operative elastic force curve of the spring.

20. An electrically actuatable pre-mix carbonated beverage dispensing system comprising (a) a beverage dispenser having a plurality of pre-mix carbonated beverage dispensing valves, each dispensing valve having a normally closed poppet valve for on-off control of beverage flow;

(b) means for supplying pre-mix carbonated beverage to each of said valves;

(c) an electrical solenoid for each valve, each solenoid having a coil fixed with respect to a respective valve and a movable plunger within the coil;

(d) a single voltage reducing and current limiting transformer for said solenoids;

(e) an electrical switch for each solenoid, said switches being connected in parallel to an output side of the transformer;

(f) a spring elastically and operatively connecting each solenoid plunger to a respective said normally closed poppet valve in each respective said dispensing valve; and (g) means on the upstream end of each poppet valve for at least partially balancing the pressure of pre-mix carbonated beverage against the poppet valve, so that each closed and balanced poppet valve can be snapped open by a respective spring elastically stretched by a respective solenoid.

21. The system of claim 20, in which (a) the operative output force curve of each solenoid is above the operative elastic force curve of the spring, (b) the opening force required for each poppet valve is somewhere in said spring force curve, and (c) a plurality of said dispensing valves ar simultaneously actuatable.

22. An electrically actuatable pre-mix carbonated beverage dispensing valve, comprising (a) a valve body having an inlet, an outlet, a valve seat, and a reciprocable poppet valve normally closing and upon the valve seat;

(b) an electric solenoid having a coil fixed with respect to the body and a plunger movable with respect to the body and the frame, said solenoid being mounted on a vertical axis and above the poppet valve, said plunger being free-falling downward by gravity to a normal position;

(c) a spring elastically connecting the solenoid plunger to the poppet valve, said spring being free falling with said plunger; and (d) including a first class lever between the spring and the poppet valve, said lever having a generally vertical leg engaging the poppet valve, a fulcrum above the poppet valve, and a generally horizontal leg extending from the fulcrum to the spring.

23. The dispensing valve of claim 22, in which an operative output force curve of said solenoid extends above an operative elastic output force curve of said spring.

24. The valve of claim 22, in which the plunger and horizontal leg are rearward of the fulcrum and over the poppet valve.

* * * * *